United States Patent [19]

Spurbeck et al.

[11] Patent Number: 5,696,639
[45] Date of Patent: Dec. 9, 1997

[54] SAMPLED AMPLITUDE READ CHANNEL EMPLOYING INTERPOLATED TIMING RECOVERY

[75] Inventors: Mark S. Spurbeck, Louisville; Richard T. Behrens, Littleton; German S. Feyh, Boulder, all of Colo.

[73] Assignee: Cirrus Logic, Inc., Fremont, Calif.

[21] Appl. No.: 440,508

[22] Filed: May 12, 1995

[51] Int. Cl.$^6$ .................................................. C11B 5/09
[52] U.S. Cl. .................................. 360/5.1; 375/355
[58] Field of Search .......................... 360/51, 65, 40; 371/43; 375/340, 345, 376, 293, 232, 355, 377, 354, 350, 222, 324; 348/660; 369/59

[56] References Cited

U.S. PATENT DOCUMENTS

| | | | |
|---|---|---|---|
| 4,453,259 | 6/1984 | Miller | 375/355 |
| 4,866,647 | 9/1989 | Farrow . | |
| 5,018,166 | 5/1991 | Tjahjadi et al. | 375/232 |
| 5,127,051 | 6/1992 | Chan et al. . | |
| 5,177,734 | 1/1993 | Cummiskey et al. . | |
| 5,235,534 | 8/1993 | Potter . | |
| 5,258,933 | 11/1993 | Johnson et al. . | |
| 5,293,369 | 3/1994 | Melas et al. . | |
| 5,295,128 | 3/1994 | Hutchins et al. . | |
| 5,309,484 | 5/1994 | McLane et al. . | |
| 5,311,178 | 5/1994 | Pan et al. . | |
| 5,315,284 | 5/1994 | Bentley et al. . | |
| 5,327,298 | 7/1994 | Ottesen et al. . | |
| 5,359,631 | 10/1994 | Behrens et al. . | |
| 5,384,552 | 1/1995 | Iwasaki . | |
| 5,400,364 | 3/1995 | Yada . | |
| 5,440,532 | 8/1995 | Yokogawa et al. . | |
| 5,481,568 | 1/1996 | Yada . | |
| 5,552,942 | 9/1996 | Ziperovich et al. | 360/51 |

OTHER PUBLICATIONS

C.M. Melas, P. Sutardja, "An Asynchronous Fully Digital Channel for Magnetic Recording", *IEEE Globecom '94*, vol. 2 of 3, pp. 1144–1147, 1994.

Floyd M. Gardner, "Interpolation in Digital Modems—Part I: Fundamentals", *IEEE Transactions on Communications*, vol. 41, No. 3, Mar. 1993.

Floyd M. Gardner, "Interpolation in Digital Modems—Part II: Implementation and Performance", *IEEE Transactions on Communications*, vol. 41, No. 6, Jun. 1993.

Ronald E. Crochiere and Lawrence R. Rabiner, *Multirate Digital Signal Processing*, 1983, Prentice–Hall, pp. 127–192.

*Primary Examiner*—Aristotelis M. Psitos
*Assistant Examiner*—Patrick Wamsley
*Attorney, Agent, or Firm*—Howard H. Sheerin

[57] ABSTRACT

A sampled amplitude read channel for reading information stored on a magnetic medium by detecting digital data from a sequence of discrete time interpolated sample values, the interpolated sample values generated by interpolating a sequence of discrete time channel sample values generated by sampling pulses in an analog read signal from a magnetic read head positioned over the magnetic medium. A write VFO generates a write clock for writing digital data to the magnetic medium at a predetermined baud rate for a selected zone, and upon read back, the write VFO generates a sampling clock at a frequency slightly higher than the write frequency. A sampling device samples the analog read signal at the sampling clock rate to generate a sequence of discrete time channel samples that are not synchronized to the baud rate. The channel samples are equalized by a discrete time equalizing filter according to a predetermined partial response (PR4, EPR4, EEPR4, etc.). An interpolating timing recovery circuit, responsive to the equalized channel samples, computes an interpolation interval $\tau$ and, in response thereto, generates interpolated sample values substantially synchronized to the baud rate. The timing recovery circuit also generates a data clock for clocking a discrete time sequence detector for detecting the digital data from the interpolated sample values.

14 Claims, 7 Drawing Sheets

SAMPLED AMPLITUDE READ CHANNEL EMPLOYING INTERPOLATED TIMING RECOVERY

FIELD OF INVENTION

The present invention relates to the control of magnetic storage systems for digital computers, particularly to a sampled amplitude read channel that employs interpolated timing recovery.

CROSS REFERENCE TO RELATED APPLICATIONS AND PATENTS

This application is related to other co-pending U.S. patent applications, namely application Ser. Nos. 08/440,515 entitled "Sampled Amplitude Read Channel For Reading User Data and Embedded Servo Data From a Magnetic Medium," 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," 08/701,572 entitled "Improved Timing Recovery For Synchronous Partial Response Recording," and 08/012,266, now U.S. Pat. No. 5,424,881, entitled "Synchronous Read Channel." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector." All of the above-named patent applications and patents are assigned to the same entity, and all are incorporated herein by reference.

BACKGROUND OF THE INVENTION

In magnetic storage systems for computers, digital data serves to modulate the current in a read/write head coil so that a sequence of corresponding magnetic flux transitions are written onto a magnetic medium in concentric tracks at a predetermined baud rate. When reading this recorded data, the read/write head again passes over the magnetic medium and transduces the magnetic transitions into pulses in an analog signal that alternate in polarity. These pulses are then decoded by read channel circuitry to reproduce the digital data.

Decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to noise. As a result, discrete time sequence detectors increase the capacity and reliability of the storage system.

There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In conventional peak detection schemes, analog circuitry, responsive to threshold crossing or derivative information, detects peaks in the continuous time analog signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the concentric data tracks in the effort to increase data density, detection errors can also occur due to intersymbol interference, a distortion in the read signal caused by closely spaced overlapping pulses. This interference can cause a peak to shift out of its bit cell, or its magnitude to decrease, resulting in a detection error. The ISI effect is reduced by decreasing the data density or by employing an encoding scheme to ensure a minimum number of "0" bits occur between "1" bits. For example, a (d,k) run length limited (RLL) code constrains to d the minimum number of "0" bits between "1" bits, and to k the maximum number of consecutive "0" bits. A typical RRL (1,7) ⅔ rate code encodes 8 bit data words into 12 bit codewords to satisfy the (1,7) constraint.

Sampled amplitude detection, such as partial response (PR) with Viterbi detection, allows for increased data density by compensating for intersymbol interference and increasing channel noise immunity. Unlike conventional peak detection systems, sampled amplitude recording detects digital data by interpreting, at discrete time instances, the actual value of the pulse data. A sampling device samples the analog read signal at the baud rate (code bit rate) and an equalizing filter equalizes the sample values according to a desired partial response. A discrete time sequence detector, such as a Viterbi detector, interprets the equalized sample values in context to determine a most likely sequence for the data (i.e., maximum likelihood sequence detection MLSD). In this manner, the effect of ISI and channel noise can be taken into account during the detection process, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, Sept. 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, Nov. 1991; and Carley et al, "Adaptive Continous-Time Equalization Followed By FDTS/DF Sequence Detection", *Digest of The Magnetic Recording*

Conference, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, Sept. 1994; and Abbott et al, "Timing Recovery For Adaptive Decision Feedback Equalization of The Magnetic Storage Channel", *Globecom'90 IEEE Global Telecommunications Conference* 1990, San Diego, Calif., Nov. 1990, pp.1794–1799; and Abbott et al, "Performance of Digital Magnetic Recording with Equalization and Offtrack Interference", *IEEE Transactions on Magnetics*, Vol. 27, No. 1, Jan. 1991; and Cioffi et al, "Adaptive Equalization in Magnetic-Disk Storage Channels", *IEEE Communication Magazine*, Feb. 1990; and Roger Wood, "Enhanced Decision Feedback Equalization", *Intermag'90*.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In prior art sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the decision-directed feedback system to control timing recovery in sampled amplitude read channels. A phase detector generates a phase error based on the difference between the estimated samples and the read signal samples. A loop filter filters the phase error, and the filtered phase error operates to synchronize the channel samples to the baud rate.

In prior art timing recovery methods, the phase error adjusts the frequency of a sampling clock which is typically the output of a variable frequency oscillator (VFO). The output of the VFO controls a sampling device, such as an analog-to-digital (A/D) converter, to synchronize the pulse samples to the baud rate.

Also in prior art timing recovery methods, it is helpful to first lock the PLL to a reference or nominal sampling frequency so that the desired sampling frequency, with respect to the analog pulses representing the digital data, can be acquired and tracked more efficiently. The nominal sampling frequency is the baud rate, the rate that data was written onto the medium. Therefore, one method to lock-to-reference is to generate a sinusoidal signal relative to the output of a write VFO (write clock) and inject this signal into the PLL. Once locked to the reference frequency, the PLL input switches from the write clock to the signal from the read head in order to synchronize the sampling of the waveform in response to a sinusoidal acquisition preamble recorded on the medium.

The acquisition and tracking modes for timing recovery are related to the data format of the magnetic disk. FIG. 2A shows a magnetic disk comprising a plurality of concentric data tracks 13 wherein each data track 13 is comprised of a plurality of sectors 15. Servo data in the form of wedges 17 are embedded into the sectors 15 and used to control and verify the track and sector position of the read/write head. FIG. 2B shows the format of a sector 15 comprising an acquisition preamble 68, a sync mark 70, and user data 72. The acquisition preamble is a predetermined sequence that allows timing recovery to acquire the desired sampling phase and frequency before reading the user data. After acquisition, the PLL switches to a tracking mode in order to track the desired sampling phase and frequency with respect to the analog pulses representing the user data. The sync mark signals the beginning of the user data. As illustrated in FIG. 2B, a short acquisition preamble is desirable to allow more storage area for user data.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 2A where the disk is partitioned into an outer zone 11 comprising fourteen data sectors per track, and an inner zone 27 comprising seven data sectors per track. In practice, the disk may actually be partitioned into several zones at varying data rates.

Prior techniques are known for acquiring and tracking the sampling frequency/phase based on the phase error computed from the actual signal samples and estimated signal samples obtained from symbol-by-symbol decisions. See "Timing Recovery in Digital Synchronous Receivers" by K. H. Mueller and M. Muller, *IEEE Transactions on Communications*, Vol. Com-24 (1976), pp. 516–531. Co-pending U.S. patent application Ser. No. 08/313,491 entitled "Improved Timing Recovery for Synchronous Partial Response Recording" discloses an improvement to the Mueller and Muller stochastic gradient method. In this method of timing recovery a slicer, commonly employed in a d=0 PR4 partial response recording channel, estimates the sample values by comparing the signal sample values to predetermined thresholds. A stochastic gradient circuit, which minimizes the mean squared error between the signal sample values and the estimated sample values, generates the phase error to control the frequency of the sampling VFO.

U.S. Pat. No. 5,359,631 entitled "Timing Recovery Circuit for Synchronous Waveform Sampling" discloses yet another method for timing recovery in a sampled amplitude read channel. In this method a pulse detector, commonly employed in a d=1 EPR4 or EEPR4 partial response recording channel, operates to determine the estimated sample values. Again, a stochastic gradient circuit uses the estimated sample values, together with the signal sample values, to generate the phase error for adjusting the sampling clock in the decision-directed feedback system.

The timing recovery loop filter controls the dynamics of the decision-directed feedback system. Accordingly, the loop filter coefficients are adjusted to achieve a desired transient response and tracking quality. For good tracking quality, the loop bandwidth should be narrow so that phase noise and gain variance is attenuated. During acquisition, the loop bandwidth should be as wide as possible without being unstable to achieve a fast transient response. A fast transient response results in a shorter acquisition time which minimizes the necessary length of the acquisition preamble.

Several problems have been identified with the timing recovery methods that synchronize sampling of the pulses using a variable frequency oscillator in a PLL. For instance, the slight difference in operating frequencies between the write VFO and the sampling VFO results in cross-talk that degrades the performance of timing recovery. Further, synchronous detection of embedded servo data requires an additional servo VFO to generate the center operating frequency of the sampling VFO when reading the servo data (see the above referenced co-pending U.S. patent application Ser. No. 08/440,515, entitled "Sampled Amplitude Read Channel For Reading User Data and Embedded Servo Data From a Magnetic Medium"). Yet another problem associated with conventional PLL timing recovery are the delays inherent in the sampling device and discrete time equalizing filter which cause the timing loop to be less stable. Thus, latency considerations can increase the cost and complexity of the sampling device and reduce the effectiveness of the equalizing filter. A more complex discrete time equalizing filter could equalize the samples before the timing loop, but this would require reconstruction at the filter's output from discrete-time back to continuous-time for processing by the sampling PLL.

There is, therefore, a need for a new timing recovery technique for sampled amplitude recording that does not exhibit the cross talk phenomena associated with a write VFO frequency being very near a sampling VFO frequency. A further object is to avoid using a separate servo VFO for reading embedded servo data. Yet another object is to remove the sampling device and discrete time equalizing filter, and their associated latencies, from the timing recovery loop.

SUMMARY OF THE INVENTION

The objects of the present invention are achieved by incorporating into a sampled amplitude read channel for magnetic recording an interpolating timing recovery loop rather than a sampling timing recovery loop. A write VFO generates a write clock for writing digital data to a magnetic medium at a predetermined baud rate for a selected zone, and upon read back, the write VFO generates a sampling clock at a frequency slightly higher than write frequency. A sampling device samples the analog read signal at the sampling clock rate to generate a sequence of discrete time channel samples that are not synchronized to the baud rate. The channel samples are equalized by a discrete time equalizing filter according to a predetermined partial response (PR4, EPR4, EEPR4, etc.). An interpolating timing recovery circuit, responsive to the equalized channel samples, computes an interpolation interval τ and, in response thereto, generates interpolated sample values substantially synchronized to the baud rate. The timing recovery circuit also generates a data clock for clocking a discrete time sequence detector for detecting the digital data from the interpolated sample values.

Since the interpolating timing recovery does not use a separate sampling VFO, cross talk between the write VFO is avoided. Further, a separate servo VFO is not needed to read embedded servo data because the interpolating timing recovery can be adjusted on-the-fly to the servo data rate. Still further, the sampling device and discrete time equalizing filter have been removed from the timing recovery loop, thereby avoiding the associated latencies.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1:
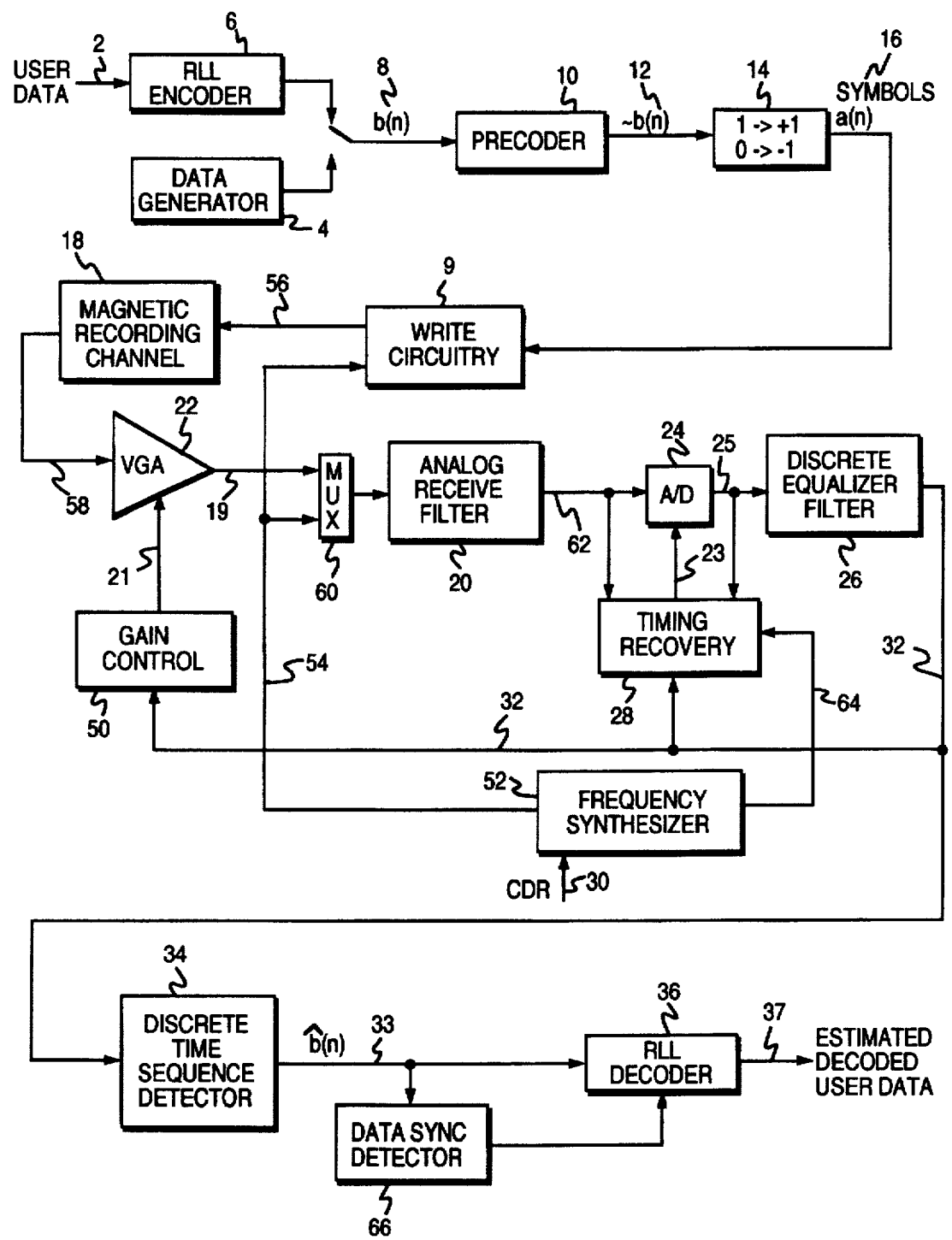
FIG. 1 is a block diagram of a conventional sampled amplitude recording channel.

Referring now to FIG. 1, shown is a detailed block diagram of a conventional sampled amplitude read channel. During a write operation, either user data 2 or preamble data from a data generator 4 (for example 2T preamble data) is written onto the medium. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1 and ~b(N)=1 into a(N)=+1. Write circuitry 9, responsive to the symbols a(n) 16, modulates the current in the recording head coil at the baud rate 1/T to record the binary sequence onto the medium. A frequency synthesizer 52 provides a baud rate write clock 54 to the write circuitry 9.

When reading the recorded binary sequence from the media, timing recovery 28 first locks to the write frequency by selecting, as the input to the read channel, the write clock 54 through a multiplexer 60. Once locked to the write frequency, the multiplexer 60 selects the signal 19 from the read head as the input to the read channel in order to acquire an acquisition preamble. A variable gain amplifier 22 adjusts the amplitude of the analog read signal 58, and an analog filter 20 provides initial equalization toward the desired response. A sampling device 24 samples the analog read signal 62 from the analog filter 20, and a discrete time filter 26 provides further equalization of the sample values 25 toward the desired response. In partial response recording, for example, the desired response is often selected from Table 1.

The equalized sample values 32 are applied to a decision directed gain control 50 and timing recovery 28 for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. A Channel Data Rate (CDR) control signal 30 adjusts a frequency range of the synthesizer 52 according to the data rate for the current zone. Gain control 50 adjusts the gain of variable gain amplifier 22 over line 21. The equalized samples Y(n) 32 are sent to a discrete time sequence detector 34, such as a maximum likelihood (ML) Viterbi sequence detector, to detect an extimated binary sequence ^b(n) 33. An RLL decoder 36 decodes the estimated binary sequence ^b(n) 33 into estimated user data 37. A data sync detector 66 detects the sync mark 70 (shown in FIG. 2B) in the data sector 15 in order to frame the operation of the RLL decoder 36. In the absence of errors, the estimated binary sequence ^b(n) 33 is equal to the recorded binary sequence b(n) 8, and the decoded user data 37 are equal to the recorded user data 2.

Data Format

Figure 2A:
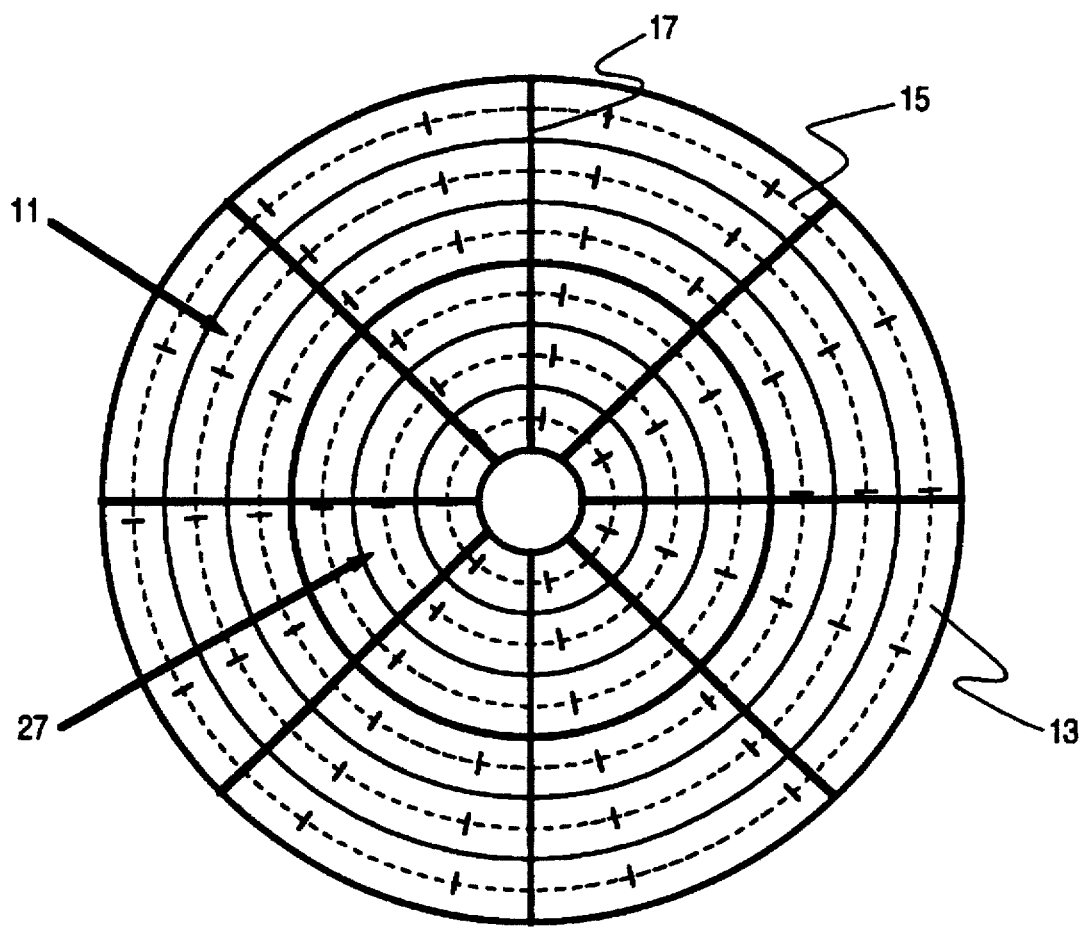
FIG. 2A shows an exemplary data format of a magnetic disk having a plurality of concentric tracks comprised of a plurality of user data sectors and embedded servo data sectors.
Figure 2B:
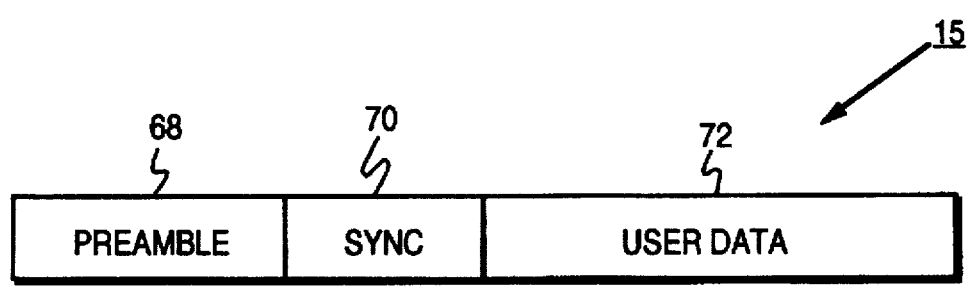
FIG. 2B shows an exemplary format of a user data sector.

FIG. 2A shows an exemplary data format of a magnetic media comprising a series of concentric data tracks 13 wherein each data track 13 is comprised of a plurality of sectors 15, and wherein a plurality of servo fields 17 are embedded in the sectors. The servo fields 17 are processed to verify the track and sector position of the read/write head. Additionally, servo bursts within the servo field 17 are processed to keep the head aligned over a centerline of the desired track 13 while writing and reading data. FIG. 2B shows the format of a sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72 (see co-pending U.S. patent application Ser. No. 08/313,491 entitled "Improved Timing Recovery For Synchronous Partial Response Recording").

Improved Sampled Amplitude Read Channel

Figure 3:
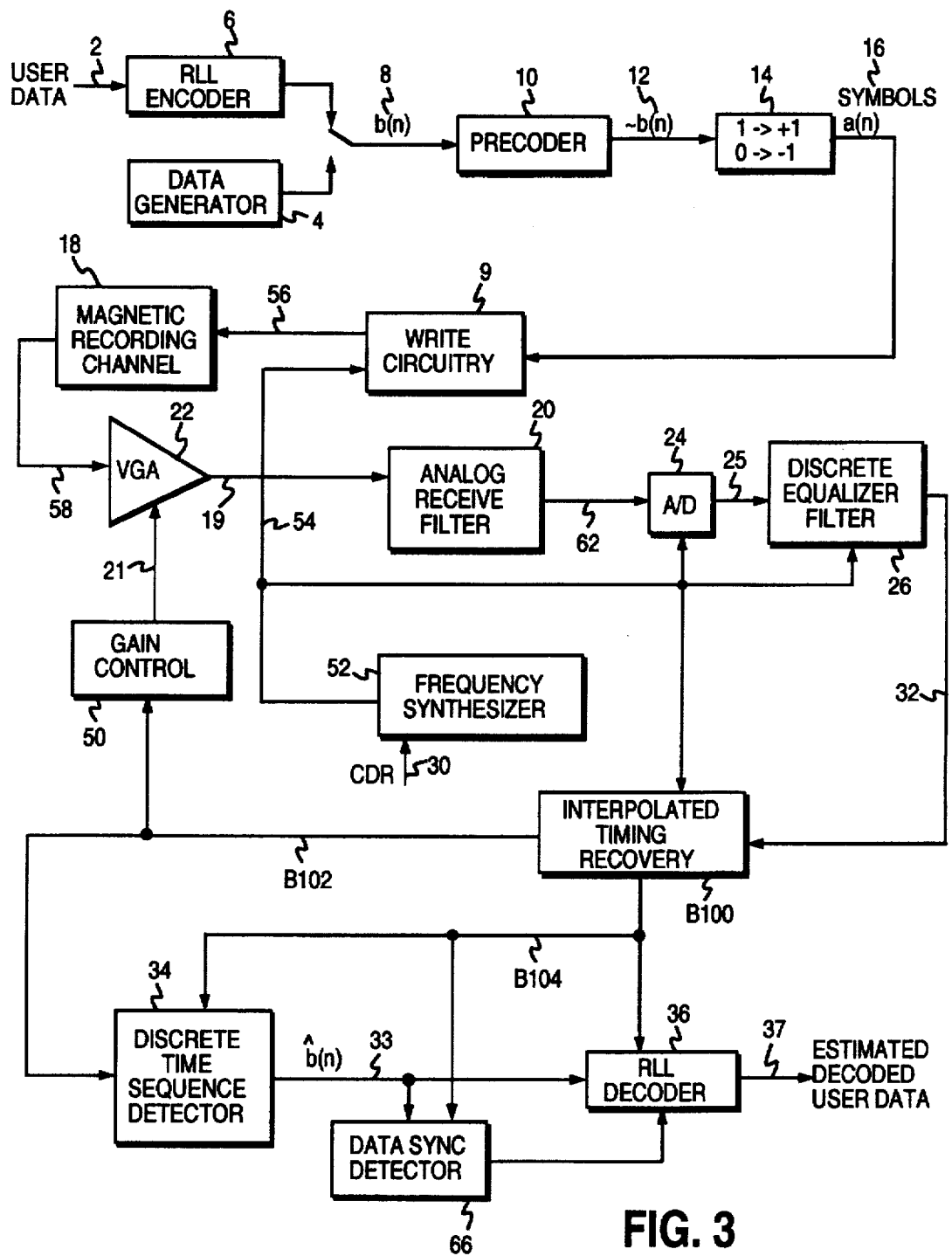
FIG. 3 is a block diagram of the improved sampled amplitude read channel of the present invention comprising interpolated timing recovery.

FIG. 3 shows the improved sampled amplitude read channel of the present invention wherein the conventional sampled timing recovery 28 of FIG. 1 has been replaced by interpolated timing recovery B100. In addition to supplying a baud rate write clock over line 54 to the write circuitry 9, the frequency synthesizer 52 generates a sampling clock applied over line 54 to the sampling device 24. When reading data, the frequency synthesizer 52 is adjusted to output the sampling clock at a slightly higher frequency than the write clock (e.g., 1% to 2%) so that the analog read signal is sampled faster than the baud rate. The sampling clock is also applied to the discrete time equalizer filter 26 and the interpolated timing recovery B100. The interpolated timing recovery B100 interpolates the equalized sample values 32 to generate interpolated sample values B102 synchronized to the baud rate. The discrete time sequence detector 34 detects the estimated binary sequence 33 from the interpolated sample values B102. Interpolated timing recovery B100 also generates a data clock B104 for clocking operation of the discrete time sequence detector 34, sync mark detector 66 and RLL decoder 36.

Timing Recovery

Figure 4A:
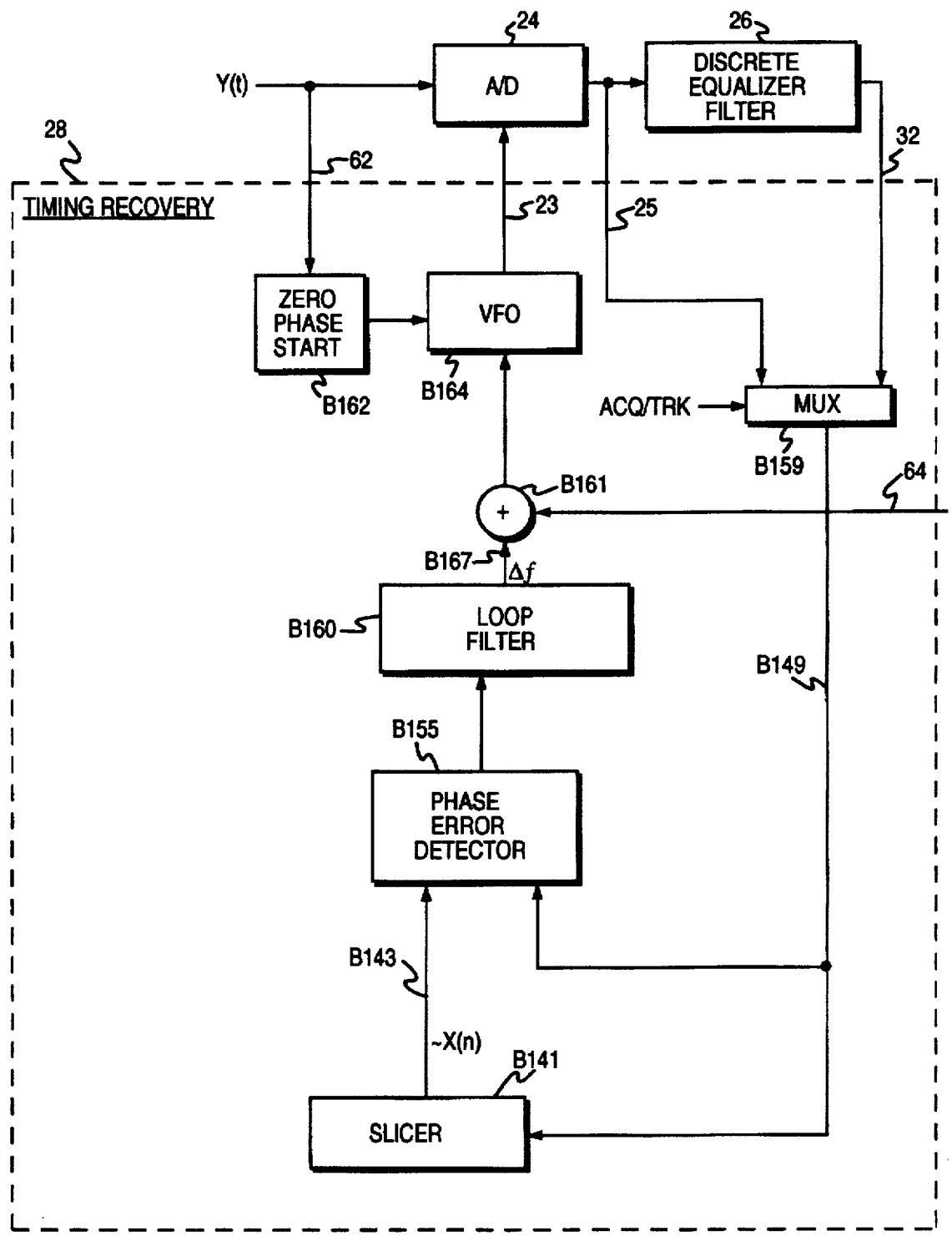
FIG. 4A is a detailed block diagram of the prior art sampling timing recovery comprising a sampling VFO.

An overview of the conventional sampling timing recovery 28 of FIG. 1 is shown in FIG. 4A. The output 23 of a variable frequency oscillator (VFO) B164 controls the sampling clock of a sampling device 24 which is typically an analog-to-digital converter (A/D) in digital read channels. A multiplexer B159 selects the unequalized sample values 25 during acquisition, and the equalized sample values 32 during tracking. The discrete equalizer filter 26 is removed from the timing loop during acquisition to avoid its associated latency. A phase error detector B155 generates a phase error in response to the sample values received over line B149 and estimated sample values ~X(n) from a sample value estimator B141, such as a slicer in a d=0 PR4 read channel, over line B143. A loop filter B160 filters the phase error to generate a frequency offset $\Delta f$ B167 that settles to a value proportional to a frequency difference between the sampling clock 23 and the baud rate. The frequency offset $\Delta f$ B167, together with the center frequency control signal 64 from the frequency synthesizer 52, adjust the sampling clock 23 at the output of the VFO B164 in order to synchronize the sampling to the baud rate. A zero phase start B162 circuit suspends operation of the VFO 164 at the beginning of acquisition in order to minimize the initial phase error between the sampling clock 23 and the read signal 62. This is achieved by disabling the VFO B164, detecting a zero crossing in the analog read signal 62, and re-enabling the VFO B164 after a predetermined delay between the detected zero crossing and the first baud rate sample.

Figure 4B:
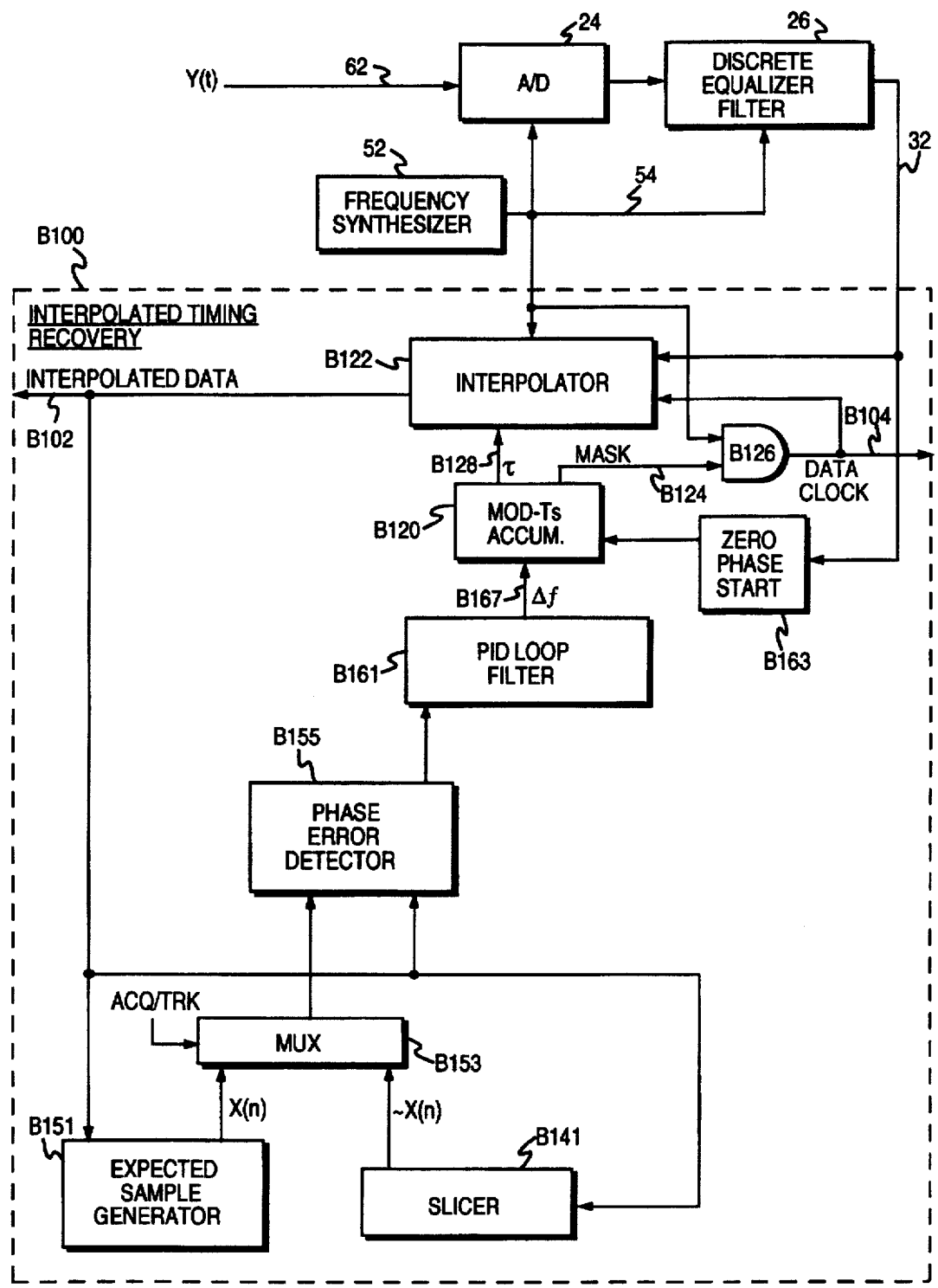
FIG. 4B is a detailed block diagram of the interpolating timing recovery of the present invention comprising an interpolator.

The interpolated timing recovery B100 of the present invention is shown in FIG. 4B. The VFO B164 of FIG. 4A is replaced with a modulo-Ts accumulator B120 and an interpolator B122. In addition, an expected sample value generator B151, responsive to interpolated sample values B102, generates expected samples X(n) used by the phase error detector B155 to compute the phase error during acquisition. A multiplexer B153 selects the estimated sample values ~X(n) from the slicer for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

In the interpolated timing recovery of the present invention, locking a VFO to a reference frequency before acquiring the preamble is no longer necessary; multiplexing 60 the write clock 54 into the analog receive filter 20 is not necessary. Further, the sampling device 24 and the discrete equalizer filter 26 together with their associated delays have been removed from the timing loop; it is not necessary to multiplex B159 around the equalizer filter 26 between acquisition and tracking. However, it is still necessary to acquire a preamble 68 before tracking the user data 72. A zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error $\tau$ from the equalized sample values 32 and loads the initial phase error into the modulo-Ts accumulator B120.

For a more detailed description of the PID loop filter B161, phase error detector B155, expected sample generator B151, and slicer B141, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "Improved Timing Recovery For Synchronous Partial Response Recording." A detailed description of the modulo-Ts accumulator B120, data clock B104, and interpolator B122 is provided below.

Interpolator

Figure 5:
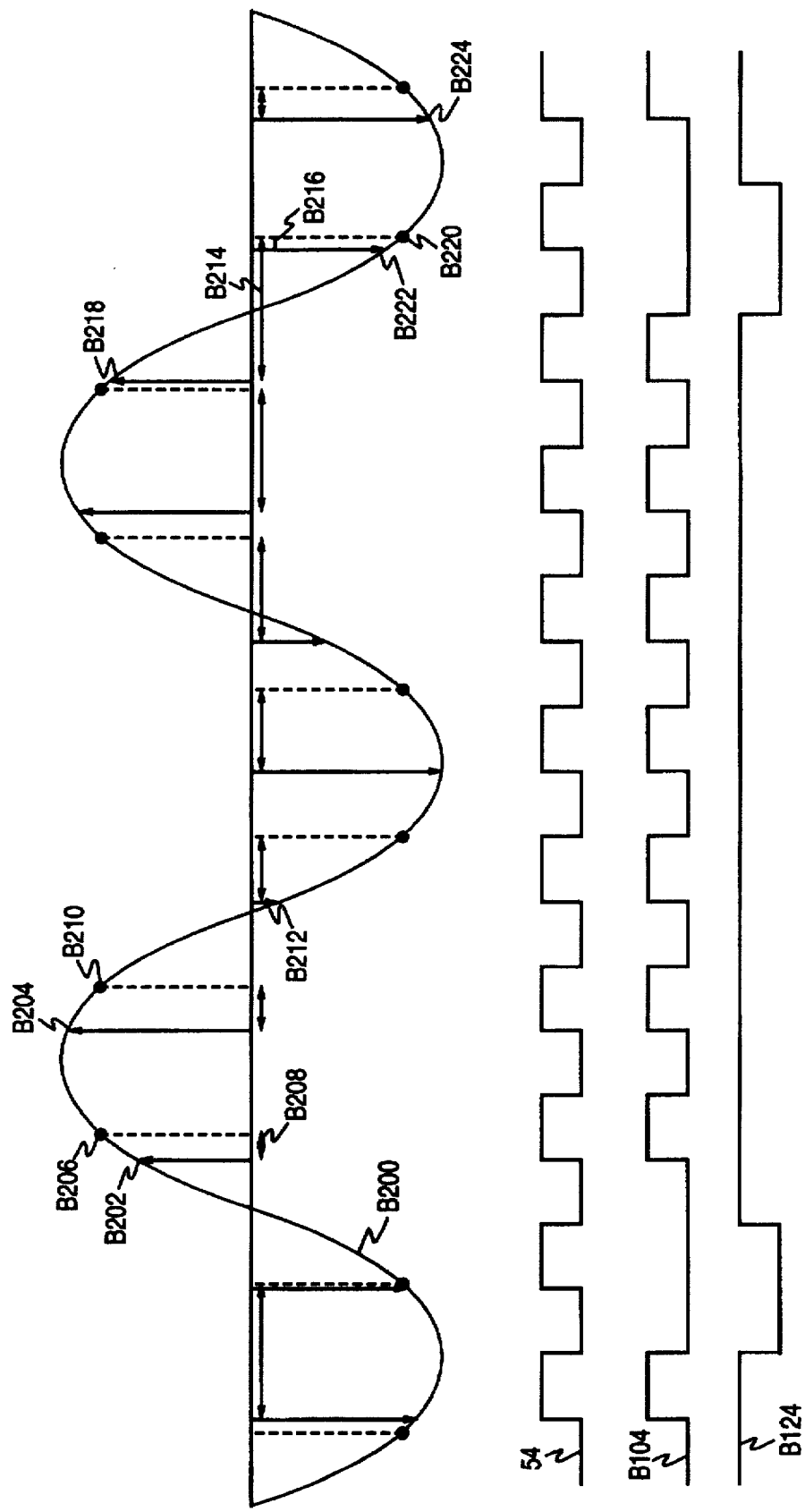
FIG. 5 illustrates the channel samples in relation to the interpolated baud rate samples for the acquisition preamble.

The interpolator B122 of FIG. 4B is understood with reference to FIG. 5 which shows a sampled 2T acquisition preamble signal B200. The target sample values are shown as black circles and the channel sample values as arrows. Below the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1)=x(N-1)+\tau \cdot (x(N)-x(N-1)); \text{ where:} \tag{1}$$

X(N−1) and x(N) are the channel samples surrounding the target sample; and $\tau$ is an interpolation interval proportional to a time difference between the channel sample value x(N−1) and the target sample value. The interpolation interval $\tau$ is generated at the output of modulo-Ts accumulator B120 which accumulates the frequency offset signal $\Delta f$ B167 at the output of the PID loop filter B161:

$$\tau=(\Sigma \Delta f) \text{ MOD TS; where:} \tag{2}$$

Ts is the sampling period of the sampling clock 54. Since the sampling clock 54 samples the analog read signal 62 slightly faster than the baud rate, it is necessary to mask the data clock every time the accumulated frequency offset $\Delta f$, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval $\tau$ B208 is generated according to equation (2) above. The next interpolated sample value corresponding to the next target value B210 is computed from channel sample values B204 and B212. This process continues until the interpolation interval $\tau$ B214 would be greater than Ts except that it "wraps" around and is actually $\tau$ B216 (i.e., the accumulated frequency offset $\Delta f$, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of $\tau$:

$$C_\tau(e^{j\omega})=e^{j\omega \tau} \tag{3}$$

which has an ideal impulse response:

$$\text{sinc }(\pi \cdot (n-\tau/T_s)). \tag{4}$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega})-C_\tau(e^{j\omega})X(e^{j\omega}); \text{ where:} \tag{5}$$

$\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi}\int_{-\pi}^{\pi} |\overline{C}_\tau(e^{j\omega}) - e^{j\omega\tau}|^2 |X(e^{j\omega})|^2 d\omega; \text{ where:} \tag{6}$$

$X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimitted to some predetermined constant $0 \leq \omega \leq \alpha\pi$ where $0<\alpha<1$; that is:

$$|X(e^{j\omega})|=0, \text{ for } |\omega| \geq \alpha\pi.$$

Then equation (6) can be expressed as:

$$E_{\tau,\alpha}^2 = \frac{1}{2\pi}\int_{-\alpha\pi}^{\alpha\pi} |\overline{C}_\tau(e^{j\omega}) - e^{j\omega\tau}|^2 |X(e^{j\omega})|^2 d\omega. \tag{7}$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n)e^{-j\omega n}; \text{ where:} \tag{8}$$

2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $c_\tau(n)$:

$$E_{\tau,\alpha}^2 = \frac{1}{2\pi}\int_{-\alpha\pi}^{\alpha\pi} \left| \sum_{n=-R}^{n=R-1} C_\tau(n)e^{-j\omega n} - e^{j\omega\tau} \right|^2 |X(e^{j\omega})|^2 d\omega. \tag{9}$$

The next step is to take the derivatives of equation (9) with respect to the coefficients $c_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \tag{10}$$

After careful manipulation, equation (10) leads to:

$$\int_{-\alpha\pi}^{\alpha\pi} \left[ \left( \sum_{n=-R}^{n=R-1} C_\tau(n)\cos(\omega(n_o - n)) \right) - \cos(\omega(n_o + \tau)) \right] |X(e^{j\omega})|^2 d\omega = 0 \quad (11)$$

for $n_o = -R, \ldots, 0, 1, \ldots, R-1$.

Defining $\phi(r)$ as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n)\phi(n - n_o) = \phi(n_o + \tau) \quad (13)$$

for $n_o = -R, \ldots, 0, 1, \ldots, R-1$.

Equation (13) defines a set of 2R linear equations in terms of the coefficients $c_\tau(n)$. Equation (13) can be expressed more compactly in matrix form:

$$\Phi_T C_\tau = \Phi_\tau; \text{ where:}$$

$C_\tau$ is a column vector of the form:

$$C_\tau = [C_\tau(-R), \ldots, c_\tau(0), \ldots, c_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \cdot & & & \cdot \\ \cdot & & & \cdot \\ \cdot & & & \cdot \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \quad (14)$$

The solution to equation (14) is:

$$C_\tau = \Phi_T^{-1} \Phi_\tau; \text{ where:}$$

$\Phi_T^{-1}$ is an inverse matrix that can be solved using well known methods.

Figure 6:
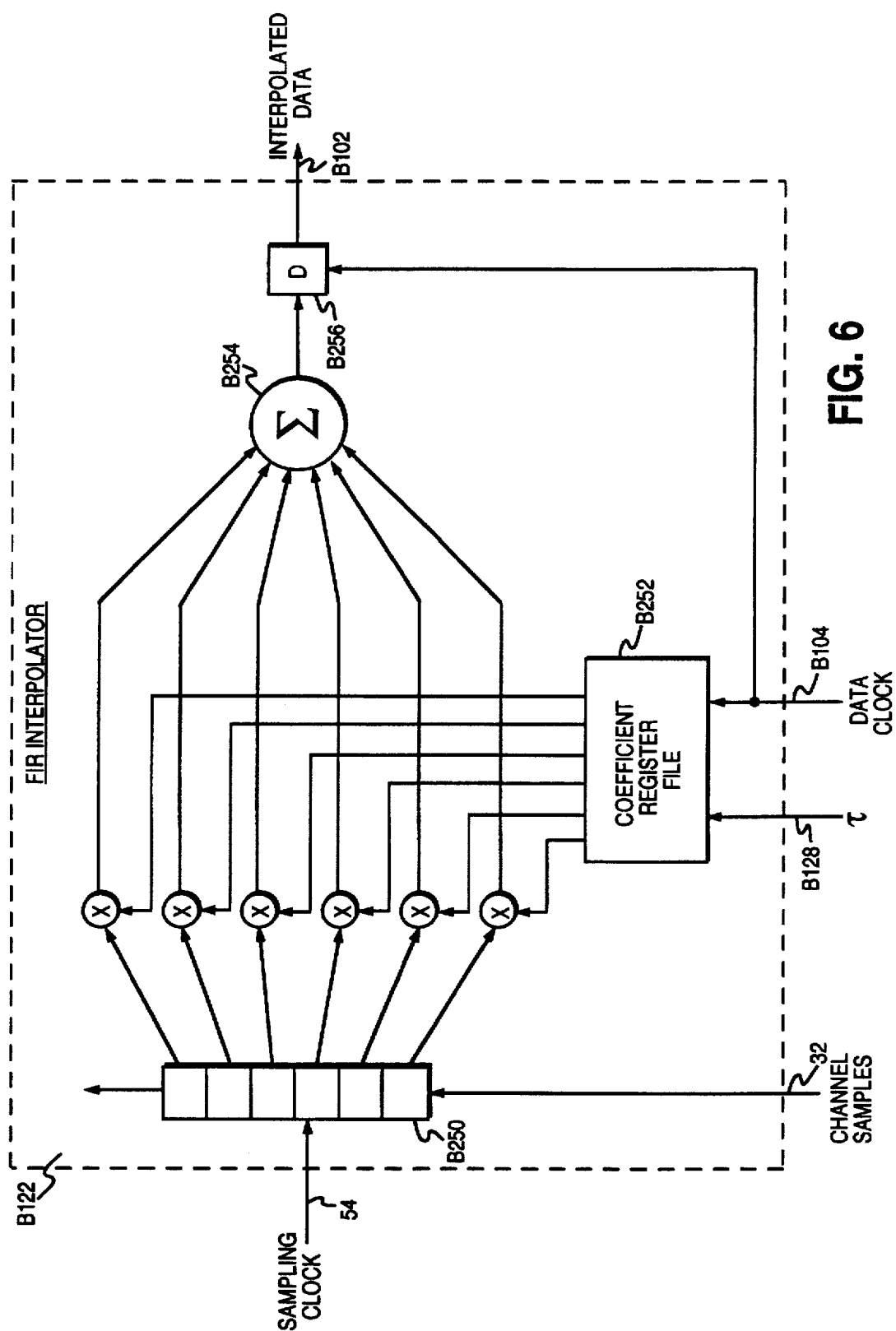
FIG. 6 shows an FIR filter implementation for the timing recovery interpolator.

Table B2 shows example coefficients $c_\tau(n)$ calculated from equation (14) with 2R=6, $\alpha$=0.8 and $X(e^{j\omega})$=PR4. The implementation of the six tap FIR filter is shown in FIG. 6. A shift register B250 receives the channel samples 32 at the sampling clock rate 54. The filter coefficients $c_\tau(n)$ are stored in a coefficient register file B252 and applied to corresponding multipliers according to the current value of $\tau$ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of $\tau$, filter the sample values in the shift register B250. Each filter outputs an interpolation value, and the current value of the interpolation interval $\tau$ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

In yet another alternative embodiment, the coefficient register file computes the filter coefficients $c_\tau(n)$ in real time as a function of $\tau$. For example, the filter coefficients $c_\tau(n)$ can be computed in real time using the coefficients of a predetermined polynomial in $\tau$ (see U.S. Pat. No. 4,866,647 issued to Farrow entitled, "A Continuously Variable Digital Delay Circuit", the disclosure of which is hereby incorporated by reference).

The embodiment of FIG. 3 assumes that the magnetic disk storage systems implements an "ID-Less" format. If an "ID" format is used, then a seperate frequency synthesizer for read and write would be preferred since it is not practical to change the synthesizer's frequency to accomodate a write immediately after reading the ID. Further, although the interpolated timing recovery of the present invention has been disclosed in relation to a d=0 PR4 read channel, the principles disclosed herein are equally applicable to other types of sampled amplitude read channels such as d=1 EPR4 or EEPR4 read channels. In a d=1 read channel, the slicer B141 of FIG. 4A is replaced by a pulse detector as described in the above reference U.S. Pat. No. 5,359,631.

The objects of the invention have been fully realized through the embodiments disclosed herein. Those skilled in the art will appreciate that the aspects of the invention can be achieved through various embodiments without departing from the essential function. The particular embodiments disclosed are illustrative and not meant to limit the scope of the invention as appropriately construed by the following claims.

TABLE 1

| Channel | Transfer Function | Dipulse Response |
|---|---|---|
| PR4 | $(1 - D)(1 + D)$ | 0, 1, 0, -1, 0, 0, 0, ... |
| EPR4 | $(1 - D)(1 + D)^2$ | 0, 1, 1, -1, -1, 0, 0, ... |
| EEPR4 | $(1 - D)(1 + D)^3$ | 0, 1, 2, 0, -2, -1, 0, ... |

TABLE B2

| $\tau \cdot 32/Ts$ | c (-2) | c (-2) | c (0) | c (1) | c (2) | c (3) |
|---|---|---|---|---|---|---|
| 0 | 0.0000 | -0.0000 | 1.0000 | 0.0000 | -0.0000 | 0.0000 |
| 1 | 0.0090 | -0.0231 | 0.9965 | 0.0337 | -0.0120 | 0.0068 |
| 2 | 0.0176 | -0.0445 | 0.9901 | 0.0690 | -0.0241 | 0.0135 |
| 3 | 0.0258 | -0.0641 | 0.9808 | 0.1058 | -0.0364 | 0.0202 |
| 4 | 0.0335 | -0.0819 | 0.9686 | 0.1438 | -0.0487 | 0.0268 |
| 5 | 0.0407 | -0.0979 | 0.9536 | 0.1829 | -0.0608 | 0.0331 |
| 6 | 0.0473 | -0.1120 | 0.9359 | 0.2230 | -0.0728 | 0.0393 |
| 7 | 0.0533 | -0.1243 | 0.9155 | 0.2638 | -0.0844 | 0.0451 |
| 8 | 0.0587 | -0.1348 | 0.8926 | 0.3052 | -0.0957 | 0.0506 |
| 9 | 0.0634 | -0.1434 | 0.8674 | 0.3471 | -0.1063 | 0.0556 |
| 10 | 0.0674 | -0.1503 | 0.8398 | 0.3891 | -0.1164 | 0.0603 |
| 11 | 0.0707 | -0.1555 | 0.8101 | 0.4311 | -0.1257 | 0.0644 |
| 12 | 0.0732 | -0.1589 | 0.7784 | 0.4730 | -0.1341 | 0.0680 |
| 13 | 0.0751 | -0.1608 | 0.7448 | 0.5145 | -0.1415 | 0.0710 |
| 14 | 0.0761 | -0.1611 | 0.7096 | 0.5554 | -0.1480 | 0.0734 |
| 15 | 0.0765 | -0.1598 | 0.6728 | 0.5956 | -0.1532 | 0.0751 |
| 16 | 0.0761 | -0.1572 | 0.6348 | 0.6348 | -0.1572 | 0.0761 |
| 17 | 0.0751 | -0.1532 | 0.5956 | 0.6728 | -0.1598 | 0.0765 |
| 18 | 0.0734 | -0.1480 | 0.5554 | 0.7096 | -0.1611 | 0.0761 |
| 19 | 0.0710 | -0.1415 | 0.5145 | 0.7448 | -0.1608 | 0.0751 |
| 20 | 0.0680 | -0.1341 | 0.4730 | 0.7784 | -0.1589 | 0.0732 |
| 21 | 0.0644 | -0.1257 | 0.4311 | 0.8101 | -0.1555 | 0.0707 |
| 22 | 0.0603 | -0.1164 | 0.3891 | 0.8398 | -0.1503 | 0.0674 |
| 23 | 0.0556 | -0.1063 | 0.3471 | 0.8674 | -0.1434 | 0.0634 |

TABLE B2-continued

| τ · 32/Ts | c (−2) | c (−2) | c (0) | c (1) | c (2) | c (3) |
|---|---|---|---|---|---|---|
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

We claim:

1. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the pulses modulated at a predetermined baud rate, the sampled amplitude read channel comprising:

(a) a sampling clock;

(b) a sampling device, responsive to the sampling clock, for sampling the analog read signal to generate the channel sample values;

(c) interpolated timing recovery circuit, responsive to the channel sample values, for generating the interpolated sample values; and (d) a discrete time detector for detecting the data from the interpolated sample values;

wherein the sampling clock cycles at a rate slightly higher than the baud rate.

2. The sampled amplitude read channel as recited in claim 1, wherein the interpolated timing recovery circuit comprises an AND gate responsive to the sampling clock and a mask signal, having an output for outputting the data clock, wherein the mask signal selectively masks sampling clock cycles such that the frequency of the data clock substantially matches the baud rate on average.

3. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the pulses modulated at a predetermined baud rate, the sampled amplitude read channel comprising:

(a) a sampling clock;

(b) a sampling device, responsive to the sampling clock, for sampling the analog read signal to generate the channel sample values;

(c) interpolated timing recovery timing recovery, responsive to the channel sample values, for generating the interpolated sample values; and (d) a discrete time detector for detecting the data from the interpolated sample values;

wherein:

(a) the interpolated timing recovery circuit comprises an interpolator responsive to an interpolation interval τ proportional to a time difference between a channel sample value and a desired interpolated sample value;

(b) the interpolator comprises an actual interpolation filter;

(c) a plurality of coefficients $c_{\tau,k}$ of the actual interpolation filter are computed in real time as a function of τ; and (d) the function of τ is a polynomial in τ.

4. A method of interpolated timing recovery in a sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the pulses modulated at a predetermined baud rate, comprising the steps of:

(a) sampling the analog read signal at a rate approximate to the baud rate to generate the channel sample values;

(b) interpolating the channel sample values to generate the interpolated sample values;

(c) detecting the digital data from the interpolated sample values; and (d) clocking a discrete time detector at a different rate than the sampling frequency, for detecting the data from the interpolated sample values.

5. A disk drive storage system for storage and retrieval of digital data, comprising:

(a) a read head actuated over a storage medium for generating an analog read signal comprising pulses modulated at a predetermined baud rate;

(b) a sampling device for sampling the analog read signal at a rate approximate to the baud rate to generate a sequence of discrete time channel sample values;

(c) interpolated timing recovery circuit, responsive to the channel sample values, for generating interpolated sample values; and (d) a discrete time detector, responsive to the interpolated sample values, for detecting the digital data stored on the storage medium;

wherein the interpolated timing recovery circuit further generates a data clock for clocking the discrete time detector.

6. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the sampled amplitude read channel comprising:

(a) a frequency synthesizer for generating a channel clock;

(b) write circuitry, responsive to the channel clock and user data, for writing the user data to the magnetic medium;

(c) a sampling device, responsive to the channel clock, for sampling the analog read signal to generate the channel sample values;

(d) interpolated timing recovery circuit, responsive to the channel sample values, for generating the interpolated sample values; and (e) a discrete time detector for detecting the data from the interpolated sample values, wherein the interpolated timing recovery circuit generates a data clock for clocking the discrete time detector.

7. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the sampled amplitude read channel comprising:

(a) a sampling clock;

(b) a sampling device, responsive to the sampling clock, for sampling the analog read signal to generate the channel sample values;

(c) interpolated timing recovery circuit, responsive to the channel sample values, for generating the interpolated sample values; and (d) a discrete time detector for detecting the data from the interpolated sample values, wherein the interpolated timing recovery circuit generates a data clock for clocking the discrete time detector.

8. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the sampled amplitude read channel comprising:

(a) a sampling clock;

(b) a sampling device, responsive to the sampling clock, for sampling the analog read signal to generate the channel sample values;

(c) interpolated timing recovery circuit, responsive to the channel sample values, for generating the interpolated sample values, comprising:

(i) an interpolator responsive to an interpolation interval $\tau$ proportional to a time difference between a channel sample value and a desired interpolated sample value;

(ii) a frequency offset generator for generating a frequency offset $\Delta f$ proportional to a frequency difference between the sampling clock and the baud rate; and (iii) a mod-Ts accumulator for accumulating, modulo-Ts, the frequency offset $\Delta f$ to generate the interpolation interval $\tau$ where Ts is a predetermined sample period; and (d) a discrete time detector for detecting the data from the interpolated sample values.

9. The sampled amplitude read channel as recited in claim 8, wherein the frequency offset generator comprises:

(a) a phase error detector for detecting a phase error $\Delta\theta$ between an interpolated sample value and an estimated sample value; and (b) a loop filter for filtering the phase error $\Delta\theta$ to generate the frequency offset $\Delta f$.

10. The sampled amplitude read channel as recited in claim 9, wherein the loop filter is a PID filter.

11. The sampled amplitude read channel as recited in claim 8, wherein:

(a) the mod-Ts accumulator outputs a mask pulse each time a dividend result, proportional to the accumulated frequency offset $\Delta f$ integer divided by Ts, increments by 1; and (b) the mask signal is used to generate a data clock for clocking the discrete time sequence detector.

12. The sampled amplitude read channel as recited in claim 8, wherein the interpolated timing recovery circuit further comprises:

(a) a means for computing an interpolation interval $\tau$ proportional to a time difference between a channel sample value and a desired interpolated sample value; and (b) a zero phase start circuit comprising a means for computing an initial interpolation interval $\tau$.

13. A sampled amplitude read channel for reading information stored on a magnetic medium by detecting data from a sequence of discrete time interpolated sample values, the interpolated sample values generated by interpolating a sequence of discrete time channel sample values generated by sampling pulses in an analog read signal from a magnetic read head positioned over the magnetic medium, the sampled amplitude read channel comprising:

(a) a sampling clock;

(b) a sampling device, responsive to the sampling clock, for sampling the analog read signal to generate the channel sample values;

(c) interpolated timing recovery circuit, responsive to the channel sample values, for generating the interpolated sample values, comprising an interpolator responsive to an interpolation interval $\tau$ proportional to a time difference between a channel sample value and a desired interpolated sample value, wherein:

(i) the interpolator comprises an actual interpolation filter having an actual impulse response h(k) which approximates an ideal impulse response of an ideal interpolation filter:

$$\text{sinc}(\pi \cdot (k - \tau/Ts)); \text{ where:}$$

k is a time index; and
   Ts is a sample period of the sampling clock; and (ii) the actual impulse response h(k) is generated by minimizing:

$$E_r^2 = \frac{1}{2\pi} \int_{-\alpha\pi}^{\alpha\pi} |\bar{C}_r(e^{j\omega}) - e^{j\omega\tau}|^2 |X(e^{j\omega})|^2 d\omega; \text{ where:}$$

$\bar{C}_r(e^{j\omega})$ is the frequency response of the actual interpolation filter;
   $e^{j\omega\tau}$ is the frequency response corresponding to the ideal interpolation filter;
   $\alpha$ is a fractional value where $0 < \alpha \leq 1$; and
   $X(e^{j\omega})$ is a frequency response of the read channel; and (d) a discrete time detector for detecting the data from the interpolated sample values.

14. The sampled amplitude read channel as recited in claim 13, wherein $X(e^{j\omega})$ is selected from the group consisting of PR4, EPR4 and EEPR4.

* * * * *